(12) United States Patent
Rushford et al.

(10) Patent No.: US 12,535,666 B2
(45) Date of Patent: Jan. 27, 2026

(54) SAMPLE CELL FOR OPTICAL ANALYSIS

(71) Applicant: Lawrence Livermore National Security, LLC, Livermore, CA (US)

(72) Inventors: Michael C. Rushford, Livermore, CA (US); Brian Bauman, Livermore, CA (US); Tiziana C. Bond, Livermore, CA (US); Matthew Medd Roberts, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/730,092

(22) Filed: Apr. 26, 2022

(65) Prior Publication Data

US 2022/0342225 A1  Oct. 27, 2022

Related U.S. Application Data

(60) Provisional application No. 63/180,591, filed on Apr. 27, 2021.

(51) Int. Cl.
*G02B 17/06* (2006.01)
*G01N 21/03* (2006.01)
*G02B 17/00* (2006.01)
*G01J 3/02* (2006.01)

(52) U.S. Cl.
CPC .......... *G02B 17/06* (2013.01); *G01N 21/031* (2013.01); *G02B 17/004* (2013.01); *G01J 3/021* (2013.01)

(58) Field of Classification Search
CPC ............................ G01N 21/552; G02B 17/004
See application file for complete search history.

(56) References Cited

U.S. PATENT DOCUMENTS

| | | | | |
|---|---|---|---|---|
| 3,659,945 | A * | 5/1972 | Roche | G01J 3/06 356/334 |
| 3,704,955 | A * | 12/1972 | Siegler, Jr. | G01N 21/65 356/244 |
| 4,209,232 | A * | 6/1980 | Chernin | G02B 19/0023 356/246 |
| 5,550,375 | A * | 8/1996 | Peters | G01J 3/1804 250/343 |
| 9,234,794 | B2 | 1/2016 | Bond et al. | |
| 10,113,955 | B2 | 10/2018 | Chanda et al. | |

(Continued)

OTHER PUBLICATIONS

Tedder et al., "Width-Increased Dual-Pump Enhanced Coherent Anti-Stokes Raman Spectroscopy (WIDECARS)," American Institute of Aeronautics and Astronautics, pp. 1-12, 2010.

*Primary Examiner* — Hina F Ayub
(74) *Attorney, Agent, or Firm* — Knobbe, Martens, Olson & Bear, LLP

(57) ABSTRACT

In various implementations, a sample cell for optical analysis can include a housing configured to confine a sample to be analyzed. The cell can include at least one planar reflector and at least one concave reflector. The at least one planar reflector can be disposed in the housing to receive light from a light source. The at least one concave reflector can be disposed in the housing with respect to the at least one planar reflector to receive light reflected from the at least one planar reflector and to reflect at least of portion of the light back to the at least one planar reflector. The at least one planar reflector can be configured to reflect at least a portion of the light away from said at least one planar reflector to be analyzed.

21 Claims, 3 Drawing Sheets

(56) References Cited

U.S. PATENT DOCUMENTS

| | | | | |
|---|---|---|---|---|
| 10,222,595 | B2* | 3/2019 | Paul | G01N 21/031 |
| 2007/0252995 | A1* | 11/2007 | Shaw | G01N 21/552 |
| | | | | 356/437 |
| 2012/0044570 | A1* | 2/2012 | Kitahara | G01J 3/51 |
| | | | | 359/589 |
| 2021/0310866 | A1* | 10/2021 | Weidmann | G01N 21/031 |

* cited by examiner

SAMPLE CELL FOR OPTICAL ANALYSIS

CROSS-REFERENCE TO RELATED APPLICATIONS

This application claims the benefit of priority to U.S. Provisional Application No. 63/180,591, entitled "SAMPLE CELL FOR OPTICAL ANALYSIS," filed Apr. 27, 2021. The entirety of each application referenced in this paragraph is incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

BACKGROUND

Field

The present disclosure relates generally to optical apparatus for gas or liquid detection and/or analysis such as gas or liquid detection cells, and more specifically to sample cells used for optical analysis such as gas or liquid detection and/or analysis.

Description of the Related Art

Absorption cells can be used for gas analysis by allowing light to pass through a gas within the cell and then providing the light to be analyzed by gas spectroscopy, e.g., to measure the presence or concentration of a gas in a mixture of gases. In some instances, absorption cells can allow light to pass multiple times through the gas using mirrors or optical reflectors. However, improvements to current designs may be desirable.

SUMMARY

Certain implementations of sample cells for optical analysis can reduce output beam astigmatism and reduce scattered light from mirror surfaces with little or no need to adjust components in the cell. Various designs can also provide a simpler compact system with improved SWaP (size, weight, power) and a more thermally and mechanically stable optical system construction. Any one or more of these advantages and/or features may be offered by the sample cell. However, the sample cells need not include nor be limited to providing these advantages and/or features.

In various implementations, a sample cell for optical analysis can include a housing configured to confine a sample to be analyzed. The cell can also include at least one planar reflector and at least one concave reflector. The at least one planar reflector can be disposed in the housing to receive light from a light source. The at least one concave reflector can be disposed in the housing with respect to the at least one planar reflector to receive light reflected from the at least one planar reflector and to reflect at least of portion of the light back to the at least one planar reflector. The at least one planar reflector can be configured to reflect at least a portion of the light away from said at least one planar reflector to be analyzed.

In some cells, the housing can include a sample input port.

In some cells, the housing can further include an optical input. The at least one planar reflector can be disposed in the housing to receive light input into the housing through the optical input.

In some cells, the housing can further include an optical output disposed with respect to the at least one planar reflector to receive light therefrom for egress from the housing.

In some instances, the housing can include an optical input and an optical output. The optical input and optical output can be disposed on opposite sides of the at least one concave reflector.

In some instances, the housing can include an optical input and the optical input can comprise a lens.

In some instances, the housing can include an optical input and the optical input can comprise a lens configured to focus a waist of a beam of light received through the optical input onto a planar reflective surface of the at least one planar reflector.

In some instances, the housing can include an optical input and an optical output. The optical input and optical output can be configured to receive optical fibers.

In some instances, the housing can include an optical input and an optical output. The optical input and optical output can comprise optical fibers.

In some cells, the at least one planar reflector can be disposed on a first end of the housing and the at least one concave reflector can be disposed on a second end of the housing.

In some cells, the housing can include an optical input and an optical output. The optical input, the at least one planar reflector, the at least one concave reflector, and the optical output can be disposed with respect to each other such that light from the optical input reflects multiple times from the at least one planar reflector and the at least one concave reflector prior to exiting the optical output.

In some designs, the housing can include an optical input and an optical output. The optical input, the at least one planar reflector, the at least one concave reflector, and the optical output can be disposed with respect to each other such that light from the optical input reflects from 2 to 100 times from the at least one planar reflector and the at least one concave reflector prior to exiting the optical output.

In some designs, the housing can include an optical input and an optical output. The optical input, the at least one planar reflector, the at least one concave reflector, and the optical output can be disposed with respect to each other such that light from the optical input reflects from 10 to 90 times from the at least one planar reflector and the at least one concave reflector prior to exiting the optical output.

In some designs, the housing can include an optical input and an optical output. The optical input, the at least one planar reflector, the at least one concave reflector, and the optical output can be disposed with respect to each other such that light from the optical input reflects from 15 to 85 times from the at least one planar reflector and the at least one concave reflector prior to exiting the optical output.

In some instances, the housing can include an optical input. The at least one planar reflector can be disposed such that light from the optical input has a beam waist located at a planar reflective surface of the at least one planar reflector.

In some instances, the at least one planar reflector and the at least one concave reflector can comprise the same material.

In some instances, the at least one planar reflector and the at least one concave reflector can both comprise fused silica.

In some cells, the at least one planar reflector and the at least one concave reflector can be disposed on a substrate that is within the housing.

In some cells, the at least one planar reflector and the at least one concave reflector can be disposed on a substrate that is within the housing and the at least one planar reflector, the at least one concave reflector and the substrate can comprise the same material.

In some cells, the at least one planar reflector and the at least one concave reflector can be disposed on a substrate that is within the housing and the at least one planar reflector, the at least one concave reflector and the substrate can comprise fused silica.

In some cells, the at least one planar reflector and the at least one concave reflector can be coated so as to form reflective surfaces thereon.

In some designs, the curvature of the at least one concave reflector can be characterized by a center of curvature, the at least one planar reflector can have a planar reflective surface, and the planar reflective surface can be not located at the center of curvature.

In some designs, the curvature of the at least one concave reflector can be characterized by a center of curvature and a radius of curvature, the at least one planar reflector can have a planar reflective surface, and the planar reflective surface can be located within 10% of the radius of curvature from the center of curvature.

In some designs, the curvature of the at least one concave reflector can be characterized by a center of curvature and a radius of curvature, the at least one planar reflector can have a planar reflective surface, and the planar reflective surface can be located within 5% of the radius of curvature from the center of curvature.

In some designs, the curvature of the at least one concave reflector can be characterized by a center of curvature and a radius of curvature, the at least one planar reflector can have a planar reflective surface, and the planar reflective surface can be located within 2% of the radius of curvature from the center of curvature.

In some instances, the at least one concave reflector is not configured to be spatially adjusted with respect to the at least one planar reflector.

In some instances, the at least one planar reflector and the at least one concave reflector can be mounted on a substrate and not configured to be spatially moved with respect to the substrate.

In some instances, the housing can include an optical input and an optical output. The cell can comprise no more reflectors in the optical path between the optical input and optical output other than the at least one planar reflector and the at least one concave reflector.

In some cells, the at least one planar reflector can include a single planar reflector.

In some cells, the at least one concave reflector can include a single concave reflector.

In some cells, the light source and/or an optical detector can be disposed within the housing.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Various implementations of a sample cell for optical analysis, such as a gas absorption cell, can be configured to confine a gas to allow light to pass through the gas. In some cases, a portion of the light may be absorbed by the gas. In some cases, at least a portion of that light can be analyzed by, for example, using gas spectroscopy. Absorption spectroscopy can possibly identify wavelengths that are absorbed, which can possibly indicate what gases and/or processes are present. Other optical analysis of the light (e.g., interacting with matter) is also possible and should not be considered to be limited to absorption spectroscopy. For example, analysis based on Raman scattering is also possible.

Figure 1:
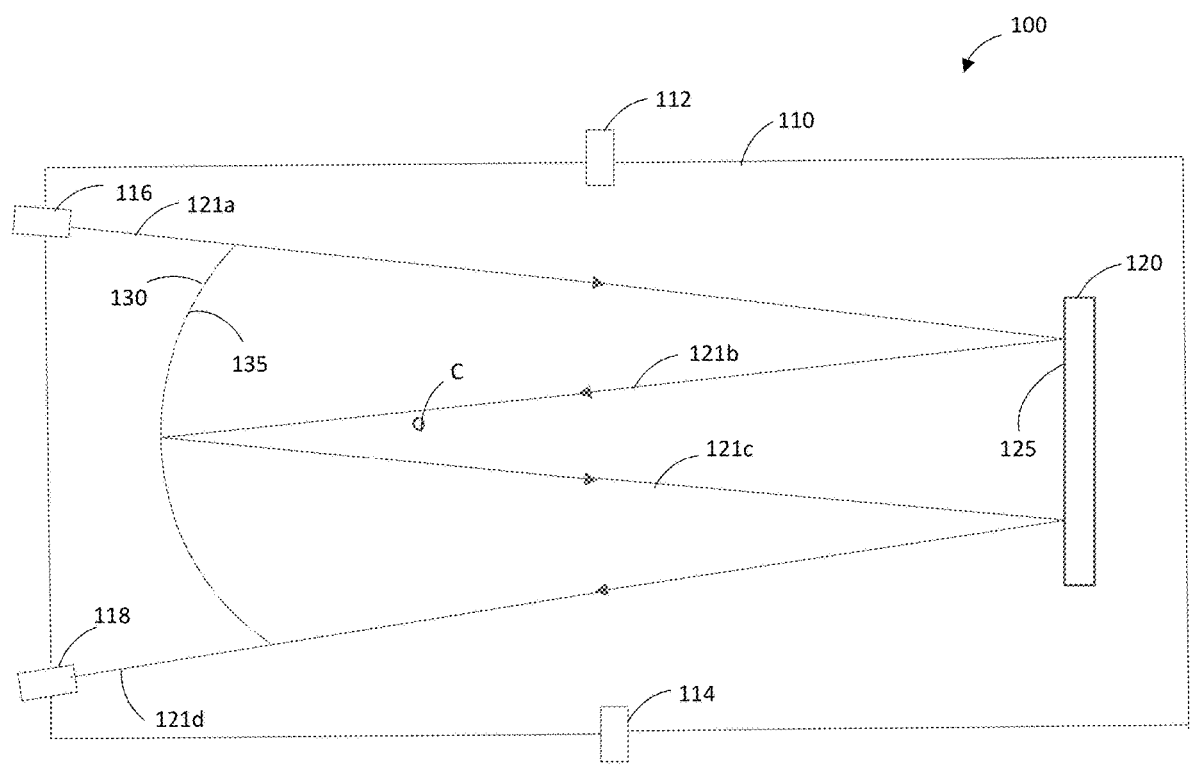
FIG. 1 is a schematic view of an example sample cell for optical analysis.

FIG. 1 is a schematic view of an example sample cell (e.g., gas or liquid cell). As illustrated, the sample cell 100 can include a housing 110 having a sample (e.g., gas or liquid) input port 112, an optical input 116, and an optical output 118. The cell 100 can also include a planar reflector 120 disposed in the housing 110 to receive light 121a input into the housing 110 through the optical input 116. The cell 100 can also include a concave reflector 130 disposed in the housing 110 with respect to the planar reflector 120 to receive light 121b from the optical input 116 that is reflected from the planar reflector 120 and to reflect at least a portion of the light 121c back to the planar reflector 120. The output port 118 can be disposed with respect to the planar reflector 120 to receive light 121d therefrom for egress from the housing 110.

In various implementations, the housing or chamber 110 can be configured to confine the sample that is to be analyzed. The sample can be a single gas or liquid or a mixture of gases and/or liquids. In FIG. 1, the housing 110 is shown schematically as a rectangle. However, the shape and size of the housing 110 are not particularly limited. The material of the housing is also not limited, and can include any material known in the art or yet to be developed for sample cells. In various implementation the housing comprises metal or a polymer (e.g., plastic) and possibly include one or more windows comprising transparent material such as glass, fused silica, etc. In some instances, 3D printing techniques can be used to fabricate the housing 110. In some designs, 3D printing techniques can provide layers of material to enable strength and compensation for an overall system with low thermal coefficient of expansion. Bolts, screws and/or other fasteners as well as possibly welds or other methods of affixing components of the structure together may be employed to form the structure. Seals such as airtight seals may be employed to reduce leakage of gas or liquid. The housing need not be limited to such designs, however.

The housing 110 can have a sample (e.g., gas or liquid) input port 112 configured to allow the sample into the housing 110. In some designs, the sample input port 112 may be used as a sample output port to allow the sample out of the housing 110. However, in some instances, the housing 110 can also have a separate sample output port 114 as illustrated in FIG. 1. The shape, size, location, and number of sample input ports and/or sample output ports are not particularly limited.

The housing 110 can additionally have an optical input 116 and optical output 118 configured respectively, to receive light for input 121a into the housing 110 and light 121d for egress from the housing 110. The optical input 116 can be optically connected to any light source (e.g., a laser or broad band light source) known in the art or yet to be developed for sample analysis such as gas or liquid analysis, e.g., gas or liquid spectroscopy. The optical output 118 can be optically connected to any optical detector known in the art or yet to be developed for sample analysis. Such an optical output and/or optical detector can be optically connected, for example, to a spectrometer or other device or instrumentation for analyzing the light that has passed through the sample cell. In various implementations, the optical input 116 and/or the optical output 118 can be configured to receive optical fibers. The optical input 116 and/or the optical output 118 may comprise, for example, a window or fiber coupler interface to which a fiber mates. In some implementations, the optical input 116 and/or the optical output 118 can comprise optical fibers. In some designs, the optical fiber can include a lens on a surface thereof. In some designs, optical fibers are not necessary. For example, diode lasers can be optically coupled or mounted to the optical input 116 with a lens configured to provide the input light mode resonating to the optical output 118. The optical detector can also be optically coupled or mounted to the optical output 118 with a collecting lens. In some designs, the optical input 116 and/or the optical output 118 can include a lens. Some designs may not include an optical input 116 and/or optical output 118. For example, the light source and/or optical detector can be mounted within the housing. Other configurations are possible.

As illustrated in FIG. 1, the cell 100 can include a planar reflector 120 disposed in the housing 110 to receive light 121a from the light source. For example, the planar reflector 120 can be disposed in the housing 110 to receive light 121a input into the housing 110 through the optical input 116. The planar reflector 120 has a planar reflective surface 125 facing the optical input 116 (or light source). This planar reflective surface 125 may comprise a reflective coating such as metal, a dielectric coating (e.g., a multilayer dielectric coating), or any material with efficient reflection. In some designs, the planar reflector 120 can be disposed such that light 121a from the optical input 116 (or light source) has a beam waist located at the planar reflective surface 125 of the planar reflector 120. In various implementations, the planar reflective surface 125 can be within −5, −4, −3, −2, −1, 0, 1, 2, 3, 4, 5, etc. mm of the beam waist (or any ranges formed by any of such values). In some instances, the planar reflective surface 125 can be within approximately the equivalent of the Rayleigh range $z_R$ of a Gaussian beam (which is associated to the beam waist $w_0$, $z_R = \pi w_0^2 n/\lambda$ where n is the index of refraction and $\lambda$ is the wavelength). In some designs, the focused input light 121a on the planar reflective surface 125 of the planar reflector 120 can reduce and/or minimize propagation path astigmatism. In some designs, the optical input 116 can include a lens or an Off Axis Focusing Mirror (OAFM). For example, the lens or OAFM can be configured to focus or locate a waist of a beam of light received through the optical input 116 onto a planar reflective surface 125 of the planar reflector 120. In various instances, the lens or OAFM can comprise fused silica. Other materials can also be used. In various implementations, the planar reflector 120 and/or planar reflective surface 125 are not large, and may for example have a width or clear aperture of 0.1, 0.2, 0.3, 0.5, 0.7, 1, 3, 5, 7, 10, 15, 20, 25, etc. mm wide (or any ranges formed by any of such values) and/or 0.1, 0.2, 0.3, 0.5, 0.7, 1, 3, 5, 7, 10, 15, etc. mm high (or any ranges formed by any of such values). Dimensions outside these ranges, however, are possible. In various implementations, polished or super-polished surfaces can help preserve the wavefront of the beams. Coatings can also be provided such that forward scattering is reduced and/or minimized to decrease the signal to noise ratio. In some designs, there is a single planar reflector 120, e.g., to reduce the number of elements and/or possible alignment issues. However, in some designs, there may be more than one planar reflector 120.

The cell 100 can include a concave reflector 130 disposed in the housing 110 with respect to the planar reflector 120 to receive light 121b from the optical input 116 (or light source) that is reflected from the planar reflector 120 and to reflect at least a portion of the light 121c back to planar reflector 120. The concave reflector 130 has a concave reflective surface 135 facing the planar reflective surface 125 of the planar reflector 120. In some implementations the concave reflector 130 and/or concave surface 135 has a radius of curvature of 20, 25, 30, 35, 40, 45, 50, 55, etc. mm (or any ranges formed by any of such values), although dimensions outside this range are possible. This concave reflective surface 135 may comprise a reflective coating such as metal, a dielectric coating, or any material with efficient reflection. In some instances, the concave reflector 130 can have spherical curvature. In some implementations, the back surface of the concave reflector 130 can be planar. In various implementations, the concave reflector 130 can be a T-mirror. In some instances, for example, a T-mirror can be provided by cutting or carving on each end of the a curved mirror, e.g., to host fibers and/or associated lenses and/or to allow the input light into the path of the reflective surfaces. In some instances, the concave reflector 130 can be a mirror with holes to host fibers and/or lenses. In various implementations, the concave reflector 130 and/or concave reflective surface 135 are not large, and may for example have a width or clear aperture of 15, 20, 25, 30, 35, 40, 45, 50, 55, etc. mm wide (or any ranges formed by any of such values) and/or from 3, 5, 7, 10, 12, 15, etc. mm high (or any ranges formed by any of such values). Dimensions outside these ranges, however, are possible. In some designs, there is a single concave reflector 130, e.g., to reduce the number of elements and/or possible alignment issues. However, in some designs, there may be more than one concave reflector 130

In some instances, the planar reflector 120 can be disposed on a first side and/or first end of the housing 110 and the concave reflector 130 can be disposed on a second side and/or second end of the housing 110. For example, in FIG. 1, the planar reflector 120 is shown in the right side of the housing 110, while the concave reflector 130 is shown in the left side of the housing 110. However, other orientations and configurations are possible. In some implementations, the concave reflective surface 135 on the concave reflector 130 can be spaced apart from the planar reflective surface 125 on the planar reflector 120 by a distance of 20, 25, 30, 35, 40, 45, 50, 55, etc. mm (or any ranges formed by any of such values) although distances outside this range are possible. This distance may, for example, be measured with respect to a location on the concave reflective surface 135 that is the center of all the locations where the light beam is incident on the concave reflective surface and a location on the planar reflective surface 125 that is the center of all the locations where the light beam is incident on the planar reflective surface in some cases. Alternatively or in addition, this distance may be measured with respect to a mechanical center and/or axis of symmetry of the concave reflective surface 135 and/or a mechanical center and/or axis of symmetry on the planar reflective surface 125. Other locations for measuring the distance may also be employed. In some implementations, the curvature of the concave reflector 130 can be characterized by a center of curvature C. In some instances, the planar reflective surface 125 of the planar reflector 120 may be located at the center of curvature C of the concave reflector 130 or concave reflective surface 135 or proximal thereto. For example, the planar reflective surface 125 may be located 20, 25, 30, 35, 40, 45, 50, 55, etc. mm from the center of curvature of the concave reflective surface 135 in some implementations (or any ranges formed by any of such values), although the location can be outside this range in various designs.

An optical output 118 (or optical detector) can be disposed with respect to the planar reflector 120 to receive light 121*d* for analysis. For example, the optical output 118 can be disposed with respect to the planar reflector 120 to receive light 121*d* therefrom for egress from the housing 110. The light path shown in FIG. 1 is for illustrative purposes only. The exact light path can be configured based on, for example, the shape (e.g., curvature), size, focal points, position, etc. of the planar reflector 120 and concave reflector 130 or other consideration or any combination thereof. In various designs, the optical input 116 (or light source), the planar reflector 120, the concave reflector 130, and the optical output 118 (or optical detector) can be disposed with respect to each other (e.g., positioned and/or oriented) such that light reflects multiple times from the planar reflector 120 and the concave reflector 130 prior to optical analysis. As an example, in various designs, the optical input 116, the planar reflector 120, the concave reflector 130, and the optical output 118 can be disposed with respect to each other (e.g., positioned and/or oriented) such that light from the optical input 116 reflects multiple times from the planar reflector 120 and the concave reflector 130 prior to exiting the optical output 118. For example, the light from the optical input 116 can reflect 2, 5, 7, 10, 15, 20, 25, 30, 35, 40, 45, 50, 55, 60, 65, 70, 75, 80, 85, 90, 95 100, etc. times (or any ranges formed by any of such values such as from 2 to 100 times, from 10 to 90 times, from 15 to 85 times, etc.) from the planar reflector 120 (and/or the concave reflector 130) prior to exiting the optical output 118. The number of times may be larger in some implementations.

In various implementations, astigmatism is reduced by the use of at least one planar mirror (e.g., the planar reflector 120) and/or using a focused input beam and/or directing or focusing the input beam on the planar reflector 120 so the concave reflector 130 reflects the beams directed or focused on the planar reflector 120 to each side of the concave reflector 130 (e.g., each side of the axis of symmetry, optical axis, or other reference axis such as a reference axis through the center, e.g., mechanical center of the concave reflector). In some designs, the input beam can be focused on the planar reflector 120 at a location at or near the axis of symmetry, optical axis, or other reference axis, e.g., to increase the number of reflections. In some instances, the light can be focused on the planar reflector 120 within a distance of 0.1, 0.2, 0.3, 0.4, 0.5, 0.6, 0.7, 0.8, 0.9, 1, etc. mm (or any ranges formed by any of such values) from the location at the axis of symmetry, optical axis, or other reference axis. In some instances, the light can be focused on the planar reflector 120 within a distance of 0.1, 0.2, 0.3, 0.4, 0.5, 0.6, 0.7, 0.8, 0.9, 1, etc. mm (or any ranges formed by any of such values) from each other. To reduce astigmatism, for example, a planar reflective surface 125 of a single planar reflector 120 can be advantageously disposed with respect to the concave reflector 130 in some implementations and focusing the input beam on the single planar reflector 120, e.g., such that the light reflects to the concave reflector 130 on each side of the concave reflector's radius of curvature, optical axis, or other reference axis. In some designs, the curvature of the concave reflector 130 can be characterized by a center of curvature C. In some instances, the planar reflective surface 125 of the planar reflector 120 might not be located at the center of curvature C of the concave reflector 130 or concave surface 135 but may instead be offset therefrom. In various instances, the distance (e.g., the longitudinal distance or a distance along or parallel to the optical axis) between the reflective surface 125 and the center of curvature C of the concave surface 135 can be smaller than the radius of curvature of the concave surface 135 although the position of these reflectors/reflective surfaces and the resultant distances therebetween need not be so limited. In various instances, the distance (e.g., the longitudinal distance or a distance along or parallel to the optical axis) between the reflective surface 125 and the center of curvature C of the concave surface 135 can be larger than the radius of curvature of the concave surface 135 although the position of these reflectors/reflective surfaces and the resultant distances therebetween need not be so limited. Nevertheless, in some designs, the planar reflective surface 125 of the planar reflector 120 can be located within 2%, 5%, 7%, 10%, etc. (or any ranges formed by any of such values) of the radius of curvature of the concave reflector 130 from the center of curvature C (e.g., smaller or larger than the radius of curvature). In some designs, the planar reflective surface 125 of the planar reflector 120 may be offset by these percentages from and not located at the center of curvature C of the concave surface 135 of the concave reflector 130. In some designs, the planar reflective surface 125 of the planar reflector 120 can be disposed normal centric about the center C of the concave reflector 130. In various instances, the concave surface 135 can be spherical; and symmetry can be imposed by the optical input and optical output locations about the concave surface 135 of the concave reflector 130.

As shown in FIG. 1, the optical input 116 (or light source) and the optical output 118 (or optical detector) can be disposed on opposite sides of the planar reflector 120 and/or concave reflector 130. For example, the optical input 116 is shown above the planar reflector 120 and/or concave reflector 130, while the optical output 118 is shown below the planar reflector 120 and/or concave reflector 130. In some designs, the optical input 116 (or light source) and the optical output 118 (or optical detector) can be disposed on the same side of the planar reflector 120 and/or concave reflector 130 (e.g., both located above or both located below the planar reflector 120 and/or concave reflector 130). In some implementations, the optical input 116 (or light source) and the optical output 118 (or optical detector) are closer to the curved reflector 130 than the planar reflector 120. Other orientations and configurations are possible.

Figure 2:
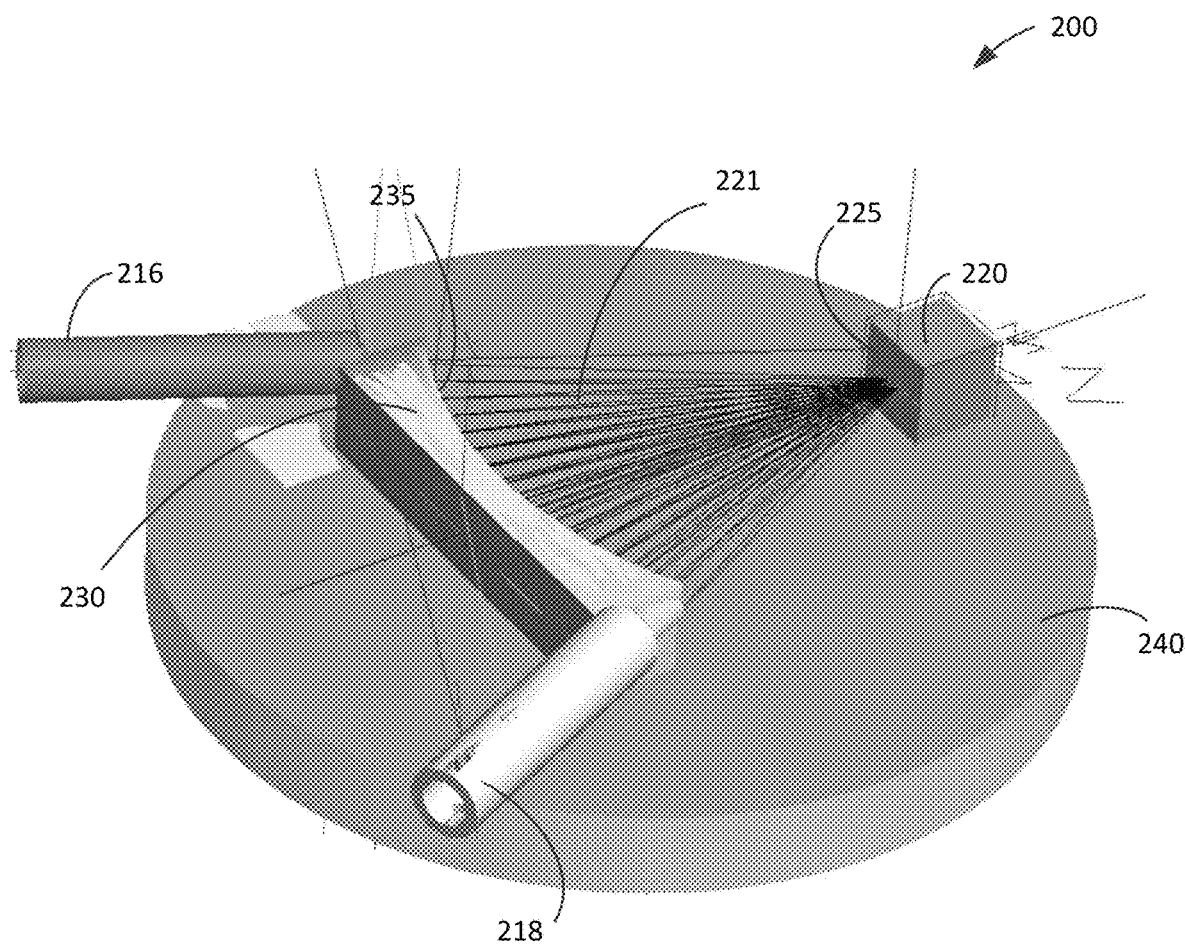
FIG. 2 is a view of the optical components within an example sample cell.

FIG. 2 shows components inside the housing of an example sample cell 200. Similar to FIG. 1, the cell 200 includes an optical input 216, and an optical output 218, a planar reflector 220, and a concave reflector 230. In various instances, the planar reflector 220 and the concave reflector 230 can be metalized or coated so as to form reflective surfaces, e.g., a planar reflective surface 225 on the planar reflector 220 and a reflective surface 235 on the concave reflector 230. Reflectors can be coated with metals, dielectrics (e.g., multilayer thin dielectric films), or any materials with efficient reflection. As shown in FIG. 2, the planar reflector 220 is disposed to receive light 221 through the optical input 216. The concave reflector 230 is disposed with respect to the planar reflector 220 to receive light 221 reflected from the planar reflector 220 and to reflect at least a portion of the light 221 back to the planar reflector 220 (e.g., multiple times). The optical output 218 is disposed with respect to the planar reflector 220 to receive light 221 therefrom, e.g., for egress from the housing.

As illustrated in FIG. 2, various implementations can provide a simplified design (e.g., a single planar reflector 220 and a single concave reflector 230). For example, compared to a design with additional reflectors (e.g., three or more reflectors), issues relating to alignment, adjustments, and/or cross talk, e.g., with the additional reflectors, are reduced. Although in some designs, one or more planar reflectors and/or concave reflectors can be utilized.

Various implementations can also provide an improved thermally and mechanically stable design by using similar materials and/or bonding of the components. For example, using materials with similar coefficients of thermal expansion can reduce stresses due to thermal expansion mismatches between components. As another example, bonding components together can reduce the need to align and/or adjust the components after construction.

In various cells 200, the planar reflector 220 and the concave reflector 230 can comprise the same material. For example, the planar reflector 220 and the concave reflector 230 can comprise fused silica, which may, for example be coated or metalized to provide respective reflective surfaces. As shown in FIG. 2, in some cells 200, the planar reflector 220 and the concave reflector 230 can be disposed on a substrate 240, e.g., that is within the housing of the cell 200. In various implementations, the planar reflector 220, the concave reflector 230, and the substrate 240 can comprise the same material. For example, the planar reflector 220, the concave reflector 230, and the substrate 240 can comprise fused silica although other materials may be used.

In some implementations, the planar reflector 220 and the concave reflector 230 can be bonded or fused to the substrate 240. In some designs, the planar reflector 220 and the concave reflector 230 can be bonded or fused to the substrate 240 without using material (e.g., adhesives or epoxies) that may outgas and/or degrade with heat. For example, optical contacting can be used in some instances to affix the planar reflector and/or the curved reflector to the substrate and possibly form a monolithic structure. In some such instances, ionic bonds can be provided between two components comprising, e.g., fused silica. In some designs, chemical welding can be used to bond components. Other designs and configurations are possible.

Accordingly, in various implementations, the curved reflector is not configured to be spatially adjusted with respect to the planar reflector, for example, to provide alignment. Similarly, in various implementations, the curved reflector is not configured to be spatially adjusted with respect to the planar reflector, for example, to provide alignment. Likewise, in various designs, the reflector and the curved reflector are mounted on a substrate and not configured to be spatially moved with respect to the substrate, for example to provide alignment. Such a design provides for increased simplification. Similarly, in various implementations, no more reflectors are included in the optical path between the optical input and optical output other than the planar reflector and the concave reflector. Once again, such a feature can simplify the design.

In various implementations, the footprint is reduced. For example, the sample cell can have a length of 35, 40, 45, 55, 60, 65, 70, 75, 80, etc. mm (or any ranges formed by any of such values) and a width of 25, 30, 35, 40, 45, 50, 55, 60, 65, etc. mm (or any ranges formed by any of such values) and a height of 5, 10, 15, 20, 25, 30, 35, 40, 45, etc. mm (or any ranges formed by any of such values). Larger or smaller cells are possible. In some implementations, the distance (e.g., lateral distance) between the input and the output can be of 15, 20, 25, 30, 35, 40, 45, 50, 55, etc. mm (or any ranges formed by any of such values). The distance of the planar reflector and the concave reflector can be of 15, 20, 25, 30, 35, 40, 45, 50, 55, etc. mm (or any ranges formed by any of such values). Similarly, the substrate can have a length of 35, 40 45, 50, 55, 60, 65, 70, 75, 80, etc. mm (or any ranges formed by any of such values) and/or a width of 25, 30, 35, 40, 45, 50, 55, 60, 65, etc. mm (or any ranges formed by any of such values) in some cases. In some designs, the substrate can be circular or oval as shown in FIG. 2. Other shapes are possible. In addition, distances and/or dimensions outside any of the ranges provided herein are possible.

Figure 3:
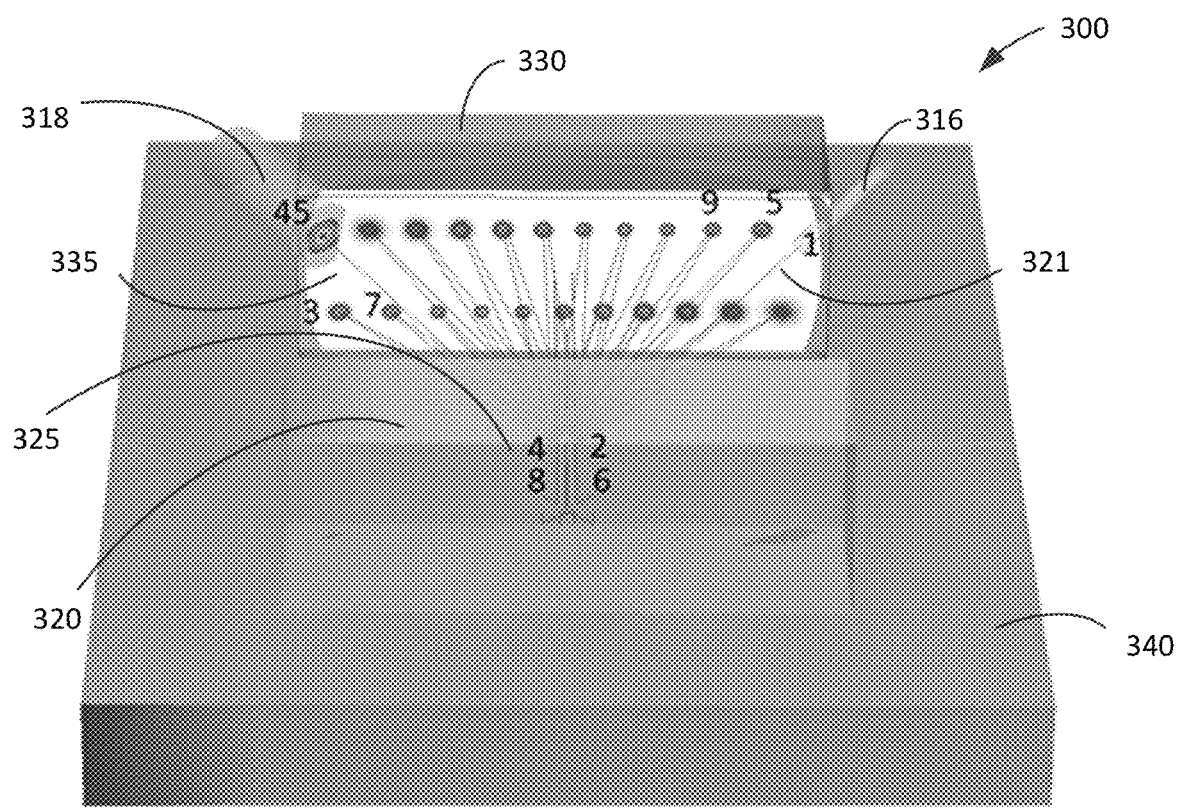
FIG. 3 is a view of the optical components within another example sample cell.

FIG. 3 shows components inside the housing of another example sample cell 300. Similar to FIGS. 1 and 2, the cell 300 includes an optical input 316, and an optical output 318, a planar reflector 320, and a concave reflector 330. As described herein, the planar reflector 320 can have a reflective surface 325 and the concave reflector 330 can have a reflective surface 335. Similar to FIG. 2, the planar reflector 320 and the concave reflector 330 can be disposed on a substrate 340.

As described herein, the exact light path can be configured based on, for example, the shape (e.g., curvature), size, focal points, position, etc. of the planar reflector 320, concave reflector 330, the optical input or other consideration or any combination thereof. In various designs, the optical input 316, the reflective surface 325 of the planar reflector 320, the reflective surface 335 of the concave reflector 330, and the optical output 318 can be disposed with respect to each other (e.g., positioned and/or oriented) such that light 321 from the optical input 316 reflects multiple times from the reflective surface 325 of the planar reflector 320 and the reflective surface 335 of the concave reflector 330 prior to exiting the optical output 318. FIG. 3 shows one example optical path (e.g., with the locations numbered from 1 to 45) of the light 321. The progress of the light along the optical path is illustrated by the locations of the light progressing along from one numbered location to the consecutively higher numbered location, e.g., progressing from location 1 to location 2, then from location 2 to location 3, then from location 3 to location 4, then from location 4 to location 5, then from location 5 to location 6, then from location 6 to location 7, then from location 7 to location 8, then from location 8 to location 9, for example. As illustrated, for example, by propagating along this progression of numbered locations 1-9, the beams are directed (alternately directed) to each side of the curved reflector (e.g., each side of the axis of symmetry, optical axis, or other reference axis such as a reference axis through the center, e.g., mechanical center of the concave reflector). Location 1, for example, is on one side and location 3 is on another side. Location 3, for example, is on one side and location 5 is on another side. Location 5, for example, is on one side and location 7 is on another side. Location 7, for example, is on one side and location 9 is on another side. Such designs may in some cases reduce astigmatism as may possibly use of the planar reflector 320. Other designs, however, are possible.

Examples

This disclosure provides various examples of sample cells for optical analysis. Some such examples include but are not limited to the following examples.

1. A sample cell for optical analysis comprising:
    a housing configured to confine a sample to be analyzed;
    at least one planar reflector disposed in said housing to receive light from a light source; and
    at least one concave reflector disposed in said housing with respect to said at least one planar reflector to receive light reflected from said at least one planar reflector and to reflect at least of portion of said light back to said at least one planar reflector,
    wherein said at least one planar reflector is configured to reflect at least a portion of said light away from said at least one planar reflector to be analyzed.

2. The cell of Example 1, wherein said housing comprises a sample input port.

3. The cell of any of said examples above, wherein said housing further comprises an optical input and wherein said at least one planar reflector is disposed in said housing to receive light input into said housing through said optical input.

4. The cell of any of said examples above, wherein said housing further comprises an optical output disposed with respect to said at least one planar reflector to receive light therefrom for egress from said housing.

5. The cell of any of said examples above, wherein said housing comprises an optical input and an optical output, and wherein said optical input and optical output are disposed on opposite sides of said at least one concave reflector.

6. The cell of any of said examples above, wherein said housing comprises an optical input and wherein said optical input comprises a lens.

7. The cell of any of said examples above, wherein said housing comprises an optical input and wherein said optical input comprise a lens configured to focus a waist of a beam of light received through said optical input onto a planar reflective surface of the at least one planar reflector.

8. The cell of any of said examples above, wherein said housing comprises an optical input and an optical output, and wherein said optical input and optical output are configured to receive optical fibers.

9. The cell of any of said examples above, wherein said housing comprises an optical input and an optical output, and wherein said optical input and optical output comprise optical fibers.

10. The cell of any of said examples above, wherein said at least one planar reflector is disposed on a first end of said housing and said at least one concave reflector is disposed on a second end of said housing.

11. The cell of any of said examples above, wherein said housing comprises an optical input and an optical output, and wherein said optical input, said at least one planar reflector, said at least one concave reflector, and said optical output are disposed with respect to each other such that light from said optical input reflects multiple times from said at least one planar reflector and said at least one concave reflector prior to exiting said optical output.

12. The cell of any of said examples above, wherein said housing comprises an optical input and an optical output, and wherein said optical input, said at least one planar reflector, said at least one concave reflector, and said optical output are disposed with respect to each other such that light from said optical input reflects from 2 to 100 times from said at least one planar reflector and said at least one concave reflector prior to exiting said optical output.

13. The cell of any of said examples above, wherein said housing comprises an optical input and an optical output, and wherein said optical input, said at least one planar reflector, said at least one concave reflector, and said optical output are disposed with respect to each other such that light from said optical input reflects from 10 to 90 times from said at least one planar reflector and at least one concave reflector prior to exiting said optical output.

14. The cell of any of said examples above, wherein said housing comprises an optical input and an optical output, and wherein said optical input, said at least one planar reflector, said at least one concave reflector, and said optical output are disposed with respect to each other such that light from said optical input reflects from 15 to 85 times from said at least one planar reflector and said at least one concave reflector prior to exiting said optical output.

15. The cell of any of said examples above, wherein said housing comprises an optical input, and wherein said at least one planar reflector is disposed such that light from said optical input has a beam waist located at a planar reflective surface of said at least one planar reflector.

16. The cell of any of said examples above, wherein said at least one planar reflector and said at least one concave reflector comprise the same material.

17. The cell of any of said examples above, wherein said at least one planar reflector and said at least one concave reflector both comprise fused silica.

18. The cell of any of said examples above, wherein said at least one planar reflector and said at least one concave reflector are disposed on a substrate that is within said housing.

19. The cell of any of said examples above, wherein said at least one planar reflector and said at least one concave reflector are disposed on a substrate that is within said housing and said at least one planar reflector, said at least one concave reflector, and said substrate comprise the same material.

20. The cell of any of said examples above, wherein said at least one planar reflector and said at least one concave reflector are disposed on a substrate that is within said housing and said at least one planar reflector, said at least one concave reflector, and said substrate comprise fused silica.

21. The cell of any of said examples above, wherein said at least one planar reflector and said at least one concave reflector are coated so as to form reflective surfaces thereon.

22. The cell of any of said examples above, wherein the curvature of said at least one concave reflector is characterized by a center of curvature, said at least one planar reflector has a planar reflective surface, and said planar reflective surface is not located at said center of curvature.

23. The cell of any of said examples above, wherein the curvature of said at least one concave reflector is characterized by a center of curvature and a radius of curvature, said at least one planar reflector has a planar reflective surface, and the planar reflective surface is located within 10% of said radius of curvature from said center of curvature.

24. The cell of any of said examples above, wherein the curvature of said at least one concave reflector is characterized by a center of curvature and a radius of curvature, said at least one planar reflector has a reflective surface, and the planar reflective surface is located within 5% of said radius of curvature from said center of curvature.

25. The cell of any of said examples above, wherein the curvature of said at least one concave reflector is characterized by a center of curvature and a radius of curvature, said at least one planar reflector has a reflective surface, and the planar reflective surface is located within 2% of said radius of curvature from said center of curvature.

26. The cell of any of said examples above, wherein the at least one concave reflector is not configured to be spatially adjusted with respect to the at least one planar reflector.

27. The cell of any of said examples above, wherein the at least one planar reflector and the at least one concave reflector are mounted on a substrate and not configured to be spatially moved with respect to the substrate.

28. The cell of any of said examples above, wherein the housing comprises an optical input and an optical output, and wherein the cell comprises no more reflectors in the optical path between the optical input and optical output other than the at least one planar reflector and the at least one concave reflector.

29. The cell of any of said examples above, wherein said at least one planar reflector comprises a single planar reflector.

30. The cell of any of said examples above, wherein said at least one concave reflector comprises a single concave reflector.

31. The cell of any of said examples above, wherein the light source and/or an optical detector are disposed within said housing.

Additional Examples

1. A sample cell for optical analysis comprising:
a housing configured to confine a sample to be analyzed;
a planar reflector disposed in said housing to receive light from a light source; and
a concave reflector disposed in said housing with respect to said planar reflector to receive light reflected from said planar reflector and to reflect at least of portion of said light back to said planar reflector,
wherein said planar reflector is configured to reflect at least a portion of said light away from said planar reflector to be analyzed.

2. The cell of Example 1, wherein said housing comprises a sample input port.

3. The cell of any of said examples above, wherein said housing further comprises an optical input and wherein said planar reflector is disposed in said housing to receive light input into said housing through said optical input.

4. The cell of any of said examples above, wherein said housing further comprises an optical output disposed with respect to said planar reflector to receive light therefrom for egress from said housing.

5. The cell of any of said examples above, wherein said housing comprises an optical input and an optical output, and wherein said optical input and optical output are disposed on opposite sides of said concave reflector.

6. The cell of any of said examples above, wherein said housing comprises an optical input and wherein said optical input comprises a lens.

7. The cell of any of said examples above, wherein said housing comprises an optical input and wherein said optical input comprise a lens configured to focus a waist of a beam of light received through said optical input onto a planar reflective surface of the planar reflector.

8. The cell of any of said examples above, wherein said housing comprises an optical input and an optical output, and wherein said optical input and optical output are configured to receive optical fibers.

9. The cell of any of said examples above, wherein said housing comprises an optical input and an optical output, and wherein said optical input and optical output comprise optical fibers.

10. The cell of any of said examples above, wherein said planar reflector is disposed on a first end of said housing and said concave reflector is disposed on a second end of said housing.

11. The cell of any of said examples above, wherein said housing comprises an optical input and an optical output, and wherein said optical input, said planar reflector, said concave reflector, and said optical output are disposed with respect to each other such that light from said optical input reflects multiple times from said planar reflector and said concave reflector prior to exiting said optical output.

12. The cell of any of said examples above, wherein said housing comprises an optical input and an optical output, and wherein said optical input, said planar reflector, said concave reflector, and said optical output are disposed with respect to each other such that light from said optical input reflects from 2 to 100 times from said planar reflector and said concave reflector prior to exiting said optical output.

13. The cell of any of said examples above, wherein said housing comprises an optical input and an optical output, and wherein said optical input, said planar reflector, said concave reflector, and said optical output are disposed with respect to each other such that light from said optical input reflects from 10 to 90 times from said planar reflector and said concave reflector prior to exiting said optical output.

14. The cell of any of said examples above, wherein said housing comprises an optical input and an optical output, and wherein said optical input, said planar reflector, said concave reflector, and said optical output are disposed with respect to each other such that light from said optical input reflects from 15 to 85 times from said planar reflector and said concave reflector prior to exiting said optical output.

15. The cell of any of said examples above, wherein said housing comprises an optical input, and wherein said planar reflector is disposed such that light from said optical input has a beam waist located at a planar reflective surface of said planar reflector.

16. The cell of any of said examples above, wherein said planar reflector and said concave reflector comprise the same material.

17. The cell of any of said examples above, wherein said planar reflector and said concave reflector both comprise fused silica.

18. The cell of any of said examples above, wherein said planar reflector and said concave reflector are disposed on a substrate that is within said housing.

19. The cell of any of said examples above, wherein said planar reflector and said concave reflector are disposed on a substrate that is within said housing and said planar reflector, said concave reflector, and said substrate comprise the same material.

20. The cell of any of said examples above, wherein said planar reflector and said concave reflector are disposed on a substrate that is within said housing and said planar reflector, said concave reflector, and said substrate comprise fused silica.

21. The cell of any of said examples above, wherein said planar reflector and said concave reflector are coated so as to form reflective surfaces thereon.

22. The cell of any of said examples above, wherein the curvature of said concave reflector is characterized by a center of curvature, said planar reflector has a planar reflective surface, and said planar reflective surface is not located at said center of curvature.

23. The cell of any of said examples above, wherein the curvature of said concave reflector is characterized by a center of curvature and a radius of curvature, said planar reflector has a planar reflective surface, and the planar reflective surface is located within 10% of said radius of curvature from said center of curvature.

24. The cell of any of said examples above, wherein the curvature of said concave reflector is characterized by a center of curvature and a radius of curvature, said planar reflector has a reflective surface, and the planar reflective surface is located within 5% of said radius of curvature from said center of curvature.

25. The cell of any of said examples above, wherein the curvature of said concave reflector is characterized by a center of curvature and a radius of curvature, said planar reflector has a reflective surface, and the planar reflective surface is located within 2% of said radius of curvature from said center of curvature.

26. The cell of any of said examples above, wherein the concave reflector is not configured to be spatially adjusted with respect to the planar reflector.

27. The cell of any of said examples above, wherein the planar reflector and the concave reflector are mounted on a substrate and not configured to be spatially moved with respect to the substrate.

28. The cell of any of said examples above, wherein the housing comprises an optical input and an optical output, and wherein the cell comprises no more reflectors in the optical path between the optical input and optical output other than the planar reflector and the concave reflector.

29. The cell of any of said examples above, wherein said cell comprises only a single planar reflector.

30. The cell of any of said examples above, wherein said cell comprises only a single concave reflector.

31. The cell of any of said examples above, wherein the light source and/or an optical detector are disposed within said housing.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. A sample cell for optical analysis comprising:
   a housing configured to include a sample therein to be analyzed;
   at least one planar reflector disposed in said housing to receive a light beam from a light source and to reflect said light beam; and
   a single concave reflector disposed in said housing with respect to said at least one planar reflector to directly receive said light beam reflected from said at least one planar reflector and to reflect at least a portion of said light beam directly back to said at least one planar reflector to be reflected by said at least one planar reflector directly back to said single concave reflector,
   wherein said at least one planar reflector is disposed to reflect at least a portion of said light beam away from said at least one planar reflector to be analyzed, and
   wherein the single concave reflector is not configured to be spatially adjusted with respect to the at least one planar reflector.

2. The cell of claim 1, wherein said sample comprises a gas or liquid and said housing comprises a sample gas or liquid input port.

3. The cell of claim 1, wherein said housing further comprises an optical input and wherein said at least one planar reflector is disposed in said housing to receive light input into said housing through said optical input, the light input comprising the light beam.

4. The cell of claim 1, wherein said housing further comprises an optical output disposed with respect to said at least one planar reflector to receive light therefrom for egress from said housing.

5. The cell of claim 1, wherein said at least one planar reflector is disposed on a first end of said housing and said single concave reflector is disposed on a second end of said housing.

6. The cell of claim 1, wherein said housing comprises an optical input and an optical output, and wherein said cell is configured such that the light beam from said optical input reflects multiple times from said at least one planar reflector back and forth to opposite sides of a reference axis through the mechanical center of said single concave reflector prior to exiting said optical output.

7. The cell of claim 1, wherein said housing comprises an optical input, and wherein said at least one planar reflector is disposed such that light from said optical input has a beam waist located at a planar reflective surface of said at least one planar reflector.

8. The cell of claim 1, wherein said at least one planar reflector and said single concave reflector comprise the same material.

9. The cell of claim 1, wherein said at least one planar reflector and said single concave reflector are disposed on a substrate that is within said housing.

10. The cell of claim 1, wherein said at least one planar reflector and said single concave reflector are coated so as to form reflective surfaces thereon.

11. The cell of claim 1, wherein the curvature of said single concave reflector is characterized by a center of curvature and a radius of curvature, said at least one planar reflector has a planar reflective surface, and the planar reflective surface is located within 10% of said radius of curvature from said center of curvature.

12. The cell of claim 1, wherein the housing comprises an optical input and an optical output, and wherein the cell comprises no more reflectors in the optical path between the optical input and optical output other than the at least one planar reflector and the single concave reflector.

13. The cell of claim 1, wherein the at least one planar reflector is a single planar reflector.

14. The cell of claim 1, wherein said housing comprises an airtight seal.

15. The cell of claim 1, wherein said single concave reflector is disposed with respect to said at least one planar reflector to directly receive the light beam reflected from said at least one planar reflector at a first location having a vertical and horizontal position and to reflect at least a portion of said light beam directly back to said at least one planar reflector to be reflected by said at least one planar reflector directly back to said single concave reflector at a second location on said single concave reflector having a different vertical and horizontal position than said first location.

16. A sample cell for optical analysis comprising:
a housing configured to include a sample therein to be analyzed, wherein said housing comprises an optical input and an optical output;
at least one planar reflector disposed in said housing to receive light from a light source; and
at least one concave reflector disposed in said housing with respect to said at least one planar reflector to receive light reflected from said at least one planar reflector and to reflect at least a portion of said light back to said at least one planar reflector,
wherein said optical input, said at least one planar reflector, said at least one concave reflector, and said optical output are disposed with respect to each other such that light from said optical input reflects multiple times from said at least one planar reflector and said at least one concave reflector prior to exiting said optical output, wherein said at least one concave reflector has an axis of symmetry, wherein said light is alternatively directed to said at least one concave reflector on each side of the axis of symmetry at least ten times without said light passing through the same point on each reflection from said at least one planar reflector,
wherein said at least one planar reflector is configured to reflect at least a portion of said light away from said at least one planar reflector to be analyzed, and
wherein said at least one planar reflector comprises a single planar reflector, said at least one concave reflector being disposed in said housing with respect to said single planar reflector to receive light reflected from said single planar reflector and to reflect at least a portion of said light back to said single planar reflector.

17. The cell of claim 16, wherein said optical input and optical output are disposed on opposite sides of said at least one concave reflector.

18. The cell of claim 16, wherein said at least one planar reflector is disposed such that light from said optical input has a beam waist located at a planar reflective surface of said at least one planar reflector.

19. The cell of claim 16, wherein the curvature of said at least one concave reflector is characterized by a center of curvature and a radius of curvature, said at least one planar reflector has a planar reflective surface, and the planar reflective surface is located within 10% of said radius of curvature from said center of curvature.

20. The cell of claim 16, wherein the cell comprises no more reflectors in the optical path between the optical input and optical output other than the at least one planar reflector and the at least one concave reflector.

21. The cell of claim 16, wherein said light is alternatively directed to said at least one concave reflector on each side of the axis of symmetry 20 times without said light passing through the same point on each reflection from said at least one planar reflector.

* * * * *